US012055202B2

(12) United States Patent
Messier et al.

(10) Patent No.: US 12,055,202 B2
(45) Date of Patent: Aug. 6, 2024

(54) DRIVETRAIN CONFIGURED FOR SYNCHRONOUS IVT TO CVT TRANSITION

(71) Applicant: TRANSMISSION CVTCORP INC., Sainte-Julie (CA)

(72) Inventors: François Messier, Varennes (CA); Jean-Robert Desmeules, Trois-Rivières (CA); Jean-François Dionne, LaPrairie (CA)

(73) Assignee: TRANSMISSION CVTCORP INC., Ste-Julie (CA)

( * ) Notice: Subject to any disclaimer, the term of this patent is extended or adjusted under 35 U.S.C. 154(b) by 0 days.

(21) Appl. No.: 18/002,765

(22) PCT Filed: Jun. 29, 2021

(86) PCT No.: PCT/CA2021/050895
§ 371 (c)(1),
(2) Date: Dec. 21, 2022

(87) PCT Pub. No.: WO2022/000085
PCT Pub. Date: Jan. 6, 2022

(65) Prior Publication Data
US 2023/0341035 A1 Oct. 26, 2023

Related U.S. Application Data

(60) Provisional application No. 63/047,567, filed on Jul. 2, 2020.

(51) Int. Cl.
*B60K 17/06* (2006.01)
*B60K 17/02* (2006.01)
(Continued)

(52) U.S. Cl.
CPC ........... *F16H 37/084* (2013.01); *B60K 17/02* (2013.01); *B60K 17/06* (2013.01); *B60K 17/28* (2013.01);
(Continued)

(58) Field of Classification Search
CPC ............... F16H 37/084; F16H 37/022; F16H 2037/026; F16H 2037/0886; B60K 17/02; B60K 17/06; B60K 17/28
(Continued)

(56) References Cited

U.S. PATENT DOCUMENTS

| 2002/0037786 | A1 | 3/2002 | Hirano et al. |
| 2012/0122624 | A1 | 5/2012 | Hawkins, Jr. et al. |
| 2014/0155220 | A1 | 6/2014 | Messier et al. |

FOREIGN PATENT DOCUMENTS

| DE | 19944792 A1 * | 4/2000 | ........... F16H 37/084 |
| DE | 102017220000 A1 * | 5/2019 | |

(Continued)

*Primary Examiner* — Roger L Pang
(74) *Attorney, Agent, or Firm* — Fay Kaplun & Marcin, LLP (57) ABSTRACT

A drivetrain for connection between the output of a prime mover and a load is described herein. The drivetrain comprising a CVT including an input connected to the output of the prime mover and an output; a forward-reverse clutch assembly including first and second inputs and an output connectable to the load; the first input of the forward-reverse clutch assembly being connected to the output of the CVT through a CVT clutch. The drivetrain also includes an IVT gear assembly having a first input connected to the output of the prime mover, a second input connected to the output of the CVT and an output connected to the second input of the forward reverse clutch assembly through an IVT clutch; and an idler gear assembly interconnecting the first and second inputs of the forward-reverse clutch assembly.

16 Claims, 10 Drawing Sheets

(51) Int. Cl.
  *B60K 17/28* (2006.01)
  *F16H 3/78* (2006.01)
  *F16H 37/02* (2006.01)
  *F16H 37/08* (2006.01)

(52) U.S. Cl.
  CPC ............. *F16H 3/78* (2013.01); *F16H 37/022* (2013.01); *F16H 2037/026* (2013.01); *F16H 2037/0886* (2013.01)

(58) Field of Classification Search
  USPC ........................................ 475/210, 214, 207
  See application file for complete search history.

(56) References Cited

FOREIGN PATENT DOCUMENTS

| | | |
|---|---|---|
| DE | 102020202287 B3 * | 12/2020 |
| EP | 2 807 403 | 12/2014 |
| WO | 2012/135936 A1 | 10/2012 |
| WO | 2013/112408 A1 | 8/2013 |

* cited by examiner

FIG. 4

DRIVETRAIN CONFIGURED FOR SYNCHRONOUS IVT TO CVT TRANSITION

FIELD

The present disclosure generally relates to vehicle drivetrains. More specifically, the present disclosure is concerned with a drivetrain provided with a Continuously Variable Transmission (CVT) and so configured to allow synchronous IVT to CVT transition.

BACKGROUND

CVTs are well known transmission mechanisms that can change through an infinite number of gear ratios between upper and lower limits. Toroidal CVTs, which are also well known, include a disks and rollers arrangement that transmits power between the disks, wherein one disk is the input and the other disk is the output. Such a transmission is used when transmission ratios have to be finely adjusted.

Conventionally, CVTs have a minimum speed that is above zero. In other words, it is not possible to have a zero output speed when the input speed is not also zero, which is a drawback in some situations.

Infinitely Variable Transmissions (IVTs), on the other hand, are basically CVTs provided with further mechanical components, often including a planetary gear assembly, that allow a zero output speed. A problem with IVTs is that power is recirculated therein and that they therefore are often required to be oversized with respect of the power transiting therethrough.

DETAILED DESCRIPTION

An object is generally to provide a drivetrain configured for synchronous IVT to CVT transition.

More specifically, according to an illustrative embodiment, there is provided a drivetrain for connection between the output of a prime mover and a load; the drivetrain comprising:
a CVT including an input connected to the output of the prime mover and an output;
a forward-reverse clutch assembly including first and second inputs and an output connectable to the load; the first input of the forward-reverse clutch assembly being connected to the output of the CVT through a CVT clutch;
an IVT gear assembly having a first input connected to the output of the prime mover, a second input connected to the output of the CVT and an output connected to the second input of the forward-reverse clutch assembly through an IVT clutch; and
an idler gear assembly interconnecting the first and second inputs of the forward-reverse clutch assembly.

According to another aspect, there is provided a drivetrain for connection between the output of a prime mover and a load; the drivetrain comprising:
a CVT including an input connected to the output of the prime mover and an output;
a forward-reverse clutch assembly including first and second inputs and an output connectable to the load; the first input of the forward-reverse clutch assembly being connected to the output of the CVT through a CVT clutch;
an IVT gear assembly including a planetary gear assembly provided with a ring gear, a sun gear and planet gears interconnected by a carrier; the ring gear defining a first input connected to the output of the prime mover, the sun gear defining a second input connected to the output of the CVT and the carrier defining an output connected to the second input of the forward-reverse clutch assembly through an IVT clutch.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

It is to be noted that the expression "prime mover" is to be construed herein and in the appended claims as an internal combustion engine a turbine engine, or any other mechanical power production element or assembly.

It is to be noted that while the expression "CVT", standing for Continuously Variable Transmission is to be construed, herein and in the appended claims as any type of Continuously variable transmission including, amongst others dual-cavity full toroidal CVT, half-toroidal CVT; single cavity toroidal CVT, Variable-diameter pulley CVT, Magnetic CVT, Ratcheting CVT, hydrostatic CVT, Cone CVT and planetary CVT.

It is to be noted that the expression "overdrive" when used in the context of a CVT, is to be construed herein and in the appended claims as a condition where the CVT ratio is such that the CVT output speed is higher than the CVT input speed. The CVT ratio (of output speed to input speed) is therefore higher that one to one (1:1).

It is to be noted that the expression "underdrive" when used in the context of a CVT, is to be construed herein and in the appended claims as a condition where the CVT ratio is such that the CVT output speed is lower than the CVT input speed. The CVT ratio (of output speed to input speed) is therefore lower that one to one (1:1).

It will also be noted that the expressions "fixed disk", when used herein and in the appended claims in the context of clutch technology, may be viewed as any element or group of elements constituting a clutch driving member. Similarly, the expressions "movable disk", when used herein and in the appended claims in the context of clutch technology, may be viewed as any element or group of elements constituting a clutch driven member.

It is to be noted that the term "drivetrain", used herein and in the appended claims, are to be construed as the intervening mechanism by which power is transmitted from a prime mover to a final drive as well as this mechanism plus the prime mover.

The expressions "connected" and "coupled" are interchangeable and should be construed herein and in the appended claims broadly so as to include any cooperative or passive association between mechanical parts or components. For example, such parts may be assembled together by direct coupling or connection, or indirectly coupled or connected using further parts. The coupling and connection can also be remote, using for example a magnetic field or else.

The expression "input", without reference to a specific component such as a shaft, should be construed herein and in the appended claims, as including any movable part of an object, an assembly, a system or a mechanism that is used to receive a mechanical work from same or from another assembly, system or mechanism. Similarly, the expression "output" should be construed as including a similar part that is used to transfer a mechanical work.

The expression "gear ratio" should be construed herein and in the appended claims broadly as meaning the ratio between the speed of rotation at the input of a machine, system or assembly to that of the output thereof.

Other objects, advantages and features of the drivetrain configured for synchronous IVT to CVT transition will become more apparent upon reading of the following non-restrictive description of illustrative embodiments thereof, given by way of example only with reference to the accompanying drawings.

Generally stated, an illustrative embodiments describe a drivetrain configured for synchronous IVT to CVT transition where the interconnection of the CVT to an IVT gear assembly is such that the CVT is in an underdrive position when the drivetrain is in IVT mode and has reached its fastest speed. Accordingly, the CVT can maintain its underdrive position while the transition from the IVT mode to the CVT mode is done. This implies that there is minimal speed mismatch during this transition, this result in a smoother and faster shift from IVT to CVT. Furthermore, the configuration of the drivetrain including an idler gear assembly enables this synchronous IVT to CVT transition to be done either in forward or in reverse as will be described hereinbelow.

Figure 1:
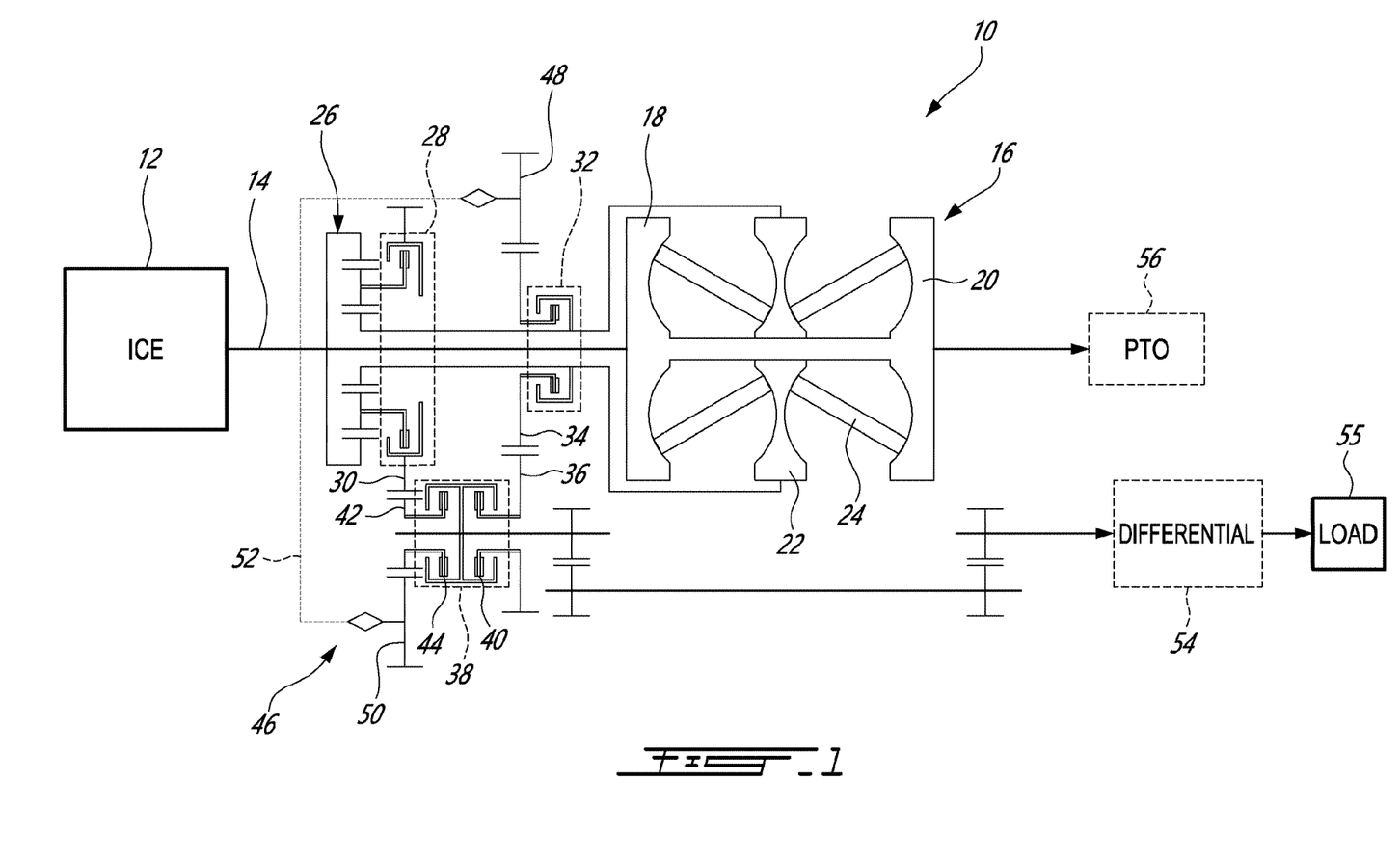
FIG. 1 is a schematic bloc diagram of a drivetrain configured for synchronous IVT to CVT transition according to a first illustrative embodiment the drivetrain being shown in a neutral mode.

Turning now more specifically to FIG. 1 of the appended drawings, a drivetrain 10 according to a first illustrative embodiment will be described.

The drivetrain 10 includes a prime mover in the form of an Internal combustion engine (ICE) 12 provided with an output shaft 14 and a schematically illustrated dual-cavity toroidal CVT 16 having two interconnected input disks 18 and 20 connected to the output shaft 14 of the prime mover 12, an output disk 22 and six rollers 24 (only four shown) provided between the output disk 22 and the input disks 18 and 20.

The drivetrain 10 also includes an IVT gear assembly in the form of a planetary gear assembly 26 having a first input coupled to the output shaft 14 and a second input coupled to the output disk 22 of the CVT 16. The planetary gear assembly also includes an output connected to the movable disk of an IVT clutch 28. The fixed disk of the IVT clutch 28 is connected to a gear 30.

As can be seen from FIG. 1, the first input is the ring of the planetary gear assembly 26, the second input is the sun of the assembly 26 and the output is the carrier thereof.

The output disk 22 of the CVT 16 is also connected to the fixed disk of a CVT clutch 32. The CVT clutch 32 includes a gear 34 associated with the movable disk thereof.

Gear 34 is meshed with a first input gear 36 of a three-position forward-reverse clutch assembly 38. This first input gear 36 is connected to a first movable disk 40 of the clutch assembly 38.

Similarly, gear 30 is meshed with a second input gear 42 of the three-position forward-reverse clutch assembly 38. This second input gear 42 is connected to a second movable disk 44 of the clutch assembly 38.

An idler gear assembly 46 interconnects the first and second input gears 36 and 42 of the clutch assembly 38. This idler gear assembly 46, which is very schematically illustrated in FIG. 1, includes a first gear 48 meshed with gear 34, and therefore to the first input gear 36, and a second gear 50 is meshed directly with the second input gear 42. A shaft 52, schematically shown in dashed lines, interconnects gears 48 and 50. The purpose of the idler gear assembly 46 will be discussed hereinbelow.

As can be seen from FIG. 1, the output of the forward-reverse clutch 38 is connected to an optional differential 54 via supplemental conventional gears and shafts arrangement. Since this arrangement is optional, conventional and could be different from the one shown herein, it will not be further discussed. Finally, the output of the optional differential 54 is connected to a load 55, for example, the traction wheels of a vehicle.

An optional Power-Take-Off (PTO) 56 is connected to the shaft 14 of the ICE 12 via the CVT 16.

An optional controller (not shown) is connected to the prime mover 12, the CVT 16 and the various clutches to receive data therefrom and/or control these elements.

Turning now to FIGS. 2 to 5 of the appended drawings, the forward operation of the drivetrain 10 will be described.

Figure 2:
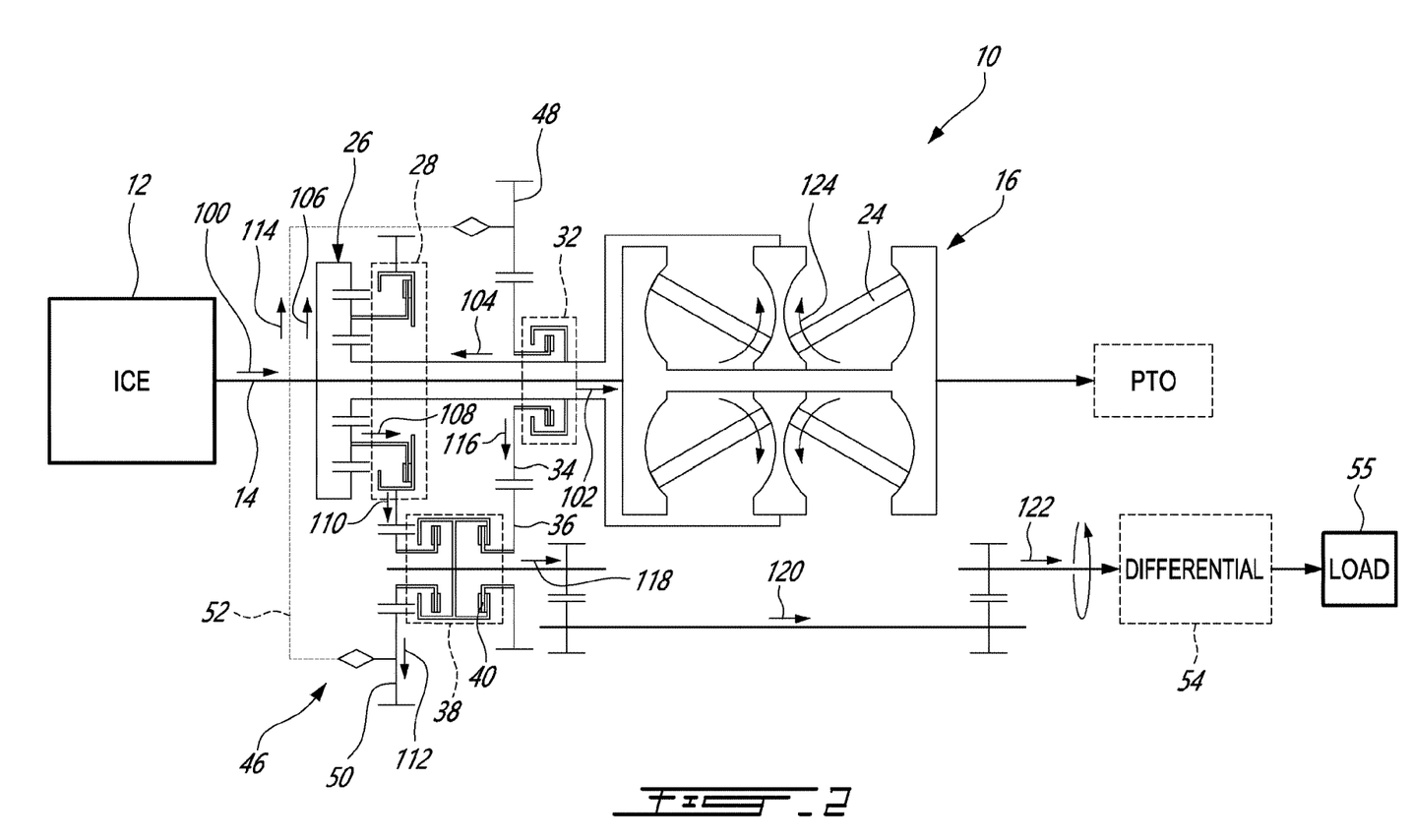
FIG. 2 is a schematic bloc diagram of the drivetrain of FIG. 1 shown in an IVT forward mode.

As can be seen on FIG. 2, the drivetrain is in its forward mode, i.e., that the first movable disk 40 of the forward reverse clutch 38 is engaged. The drivetrain is shown in its IVT configuration in FIG. 2 since the IVT clutch 28 is engaged.

The rollers 24 of the CVT 16 are so positioned that the CVT is in fully overdrive, i.e., that the CVT ratio is at its maximum.

The arrows in FIG. 2 show the power path from the ICE 12 to the load 55.

More specifically, power flows from the ICE 12 to the CVT 16 (arrows 100 and 102), and from the CVT 16 to the second input, i.e., the sun of the IVT gear assembly 26 (arrow 104). It is to be noted that since clutch 32 is disengaged, its fixed disk is rotating since it is connected to the output of the CVT 16 but no power flows therethrough.

Power also flows form the ICE 12 to the first input, i.e., the ring of the IVT gear assembly 26 (arrow 106).

Accordingly, as will be easily understood by one skilled in the art, the speed of the carrier of the IVT gear assembly 26 is a function of both the speed of the output shaft 14 of the ICE and the output speed of the CVT. It is to be noted that since the rotation direction of the output of the CVT 16 is opposite the rotation direction of the output shaft of the ICE 12, a decrease of the rotation speed on the output of the CVT 16 causes an increase of the speed of the output of the carrier of the IVT gear assembly 26 and vice-versa.

Power flows in (arrow 108) and out (arrow 110) of the IVT clutch 28 since this clutch is engaged.

To reach the first input of the forward-reverse clutch 38, the power flows through the idler gear assembly 46. More specifically, the power flows from the gear 50, through the shaft 52, to the gear 48, see arrows 112 and 114. Since gears 48, 34 and 36 are meshed, the power flows from gear 48 to gear 36, via gear 34, see (arrow 116) to therefore enter the clutch assembly 38 via the first input. Power then flows out (arrow 118) of the clutch 38 to reach the load 55 (arrows 120 and 122).

The configuration of the drivetrain 10 is such that the speed of the IVT configuration is lowest when the CVT is in its fully overdrive position as shown in FIG. 2. Accordingly, by changing the CVT ratio towards the underdrive (as shown by arrows 124 in FIG. 2), therefore decreasing the output speed of the output of the CVT, the output speed of the drivetrain increases.

Figure 3:
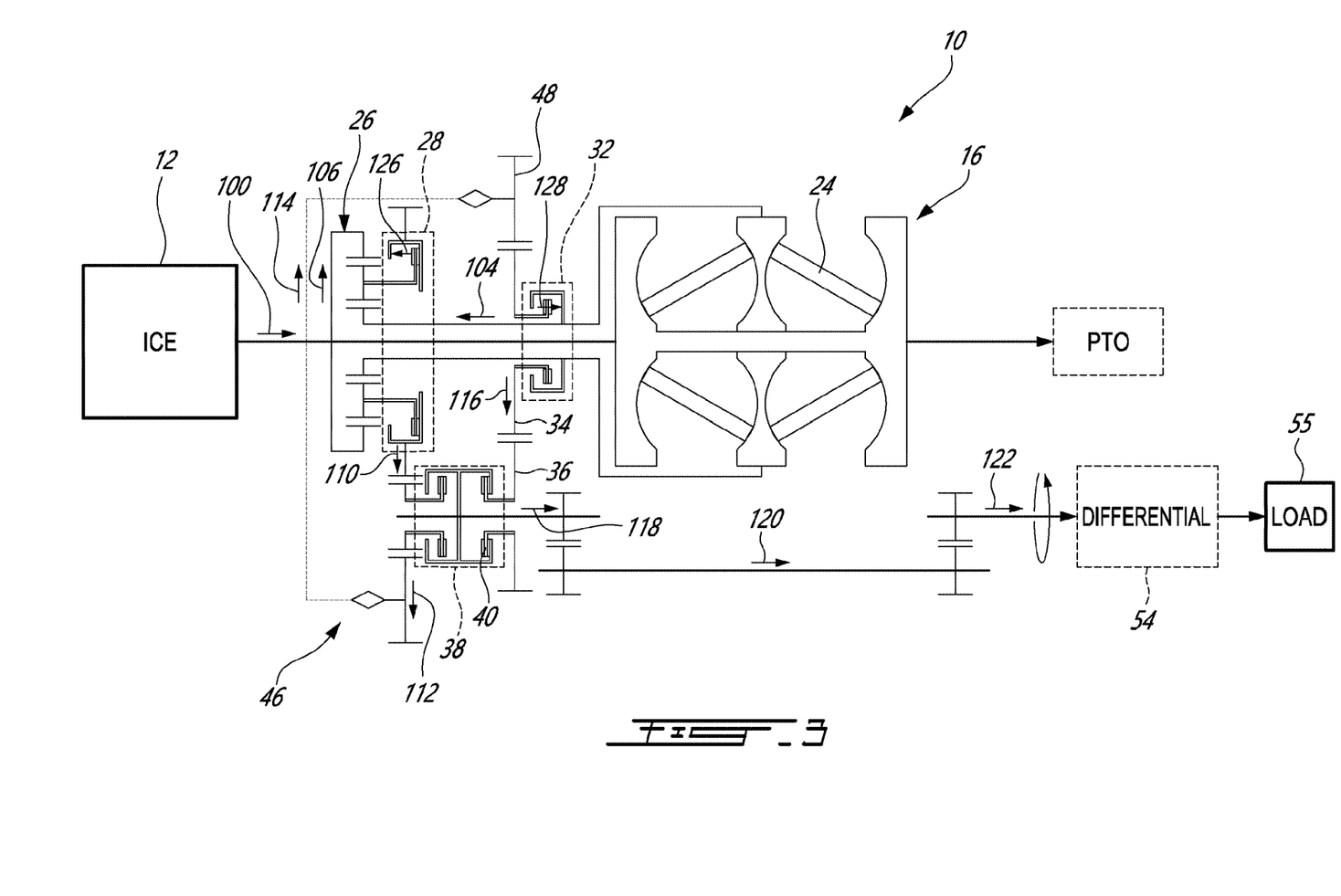
FIG. 3 is a schematic bloc diagram of the drivetrain of FIG. 1 shown at the maximal speed of the IVT forward mode.

FIG. 3 shows the drivetrain 10 when the maximum speed of the IVT configuration has been reached. Indeed, FIG. 3 shows the CVT 16 in its fully underdrive position, therefore the output speed of the CVT 16 is at its lowest.

Figure 4:
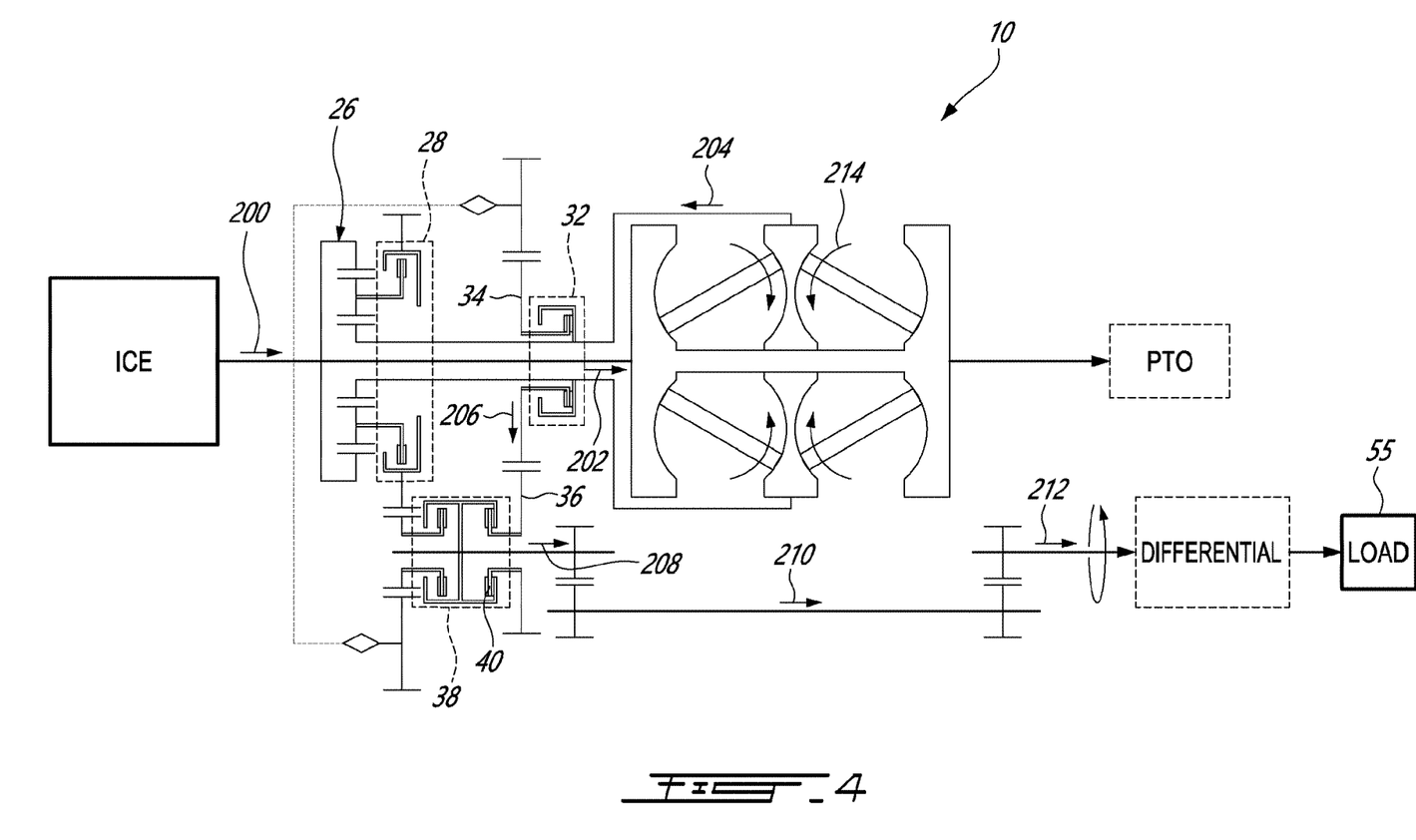
FIG. 4 is a schematic bloc diagram of the drivetrain of FIG. 1 shown during the synchronous IVT to CVT transition.

To further increase the output speed of the drivetrain 10, a transition is done from the IVT configuration (shown in FIGS. 2 and 3) to the CVT configuration (shown in FIG. 4). To achieve this transition, the IVT clutch 28 is disengaged (see arrow 126) while the CVT clutch 32 is engaged (see arrow 128).

One skilled in the art will understand that since the CVT is already in its fully underdrive position, it does not have to be brusquely moved to this position to yield the lowest speed of the CVT configuration. Furthermore, it is believed to be within the reach of one skilled in the art to calculate the gear ratios of the various gears of the drivetrain 10 so that the highest speed of the IVT configuration is equal or similar to the lowest speed of the CVT configuration. This way the transition from IVT to CVT, and vice versa, can be made simultaneously and without shocks, which is interesting for the driving feelings and for the longevity of the various mechanical parts of the drivetrain.

FIG. 4 shows the drivetrain 10 in its CVT configuration where IVT clutch 28 is disengaged and CVT clutch 32 is engaged. Since we are still in the forward mode, the first movable disk 40 of the forward-reverse clutch 38 is engaged.

The arrows in FIG. 4 show the power path from the ICE 12 to the load 55 when the drivetrain is in the CVT configuration.

More specifically, power flows from the ICE 12 to the CVT 16 (arrows 200 and 202), and from the CVT 16 to the fixed disk of the CVT clutch 32 (arrow 204). Since the clutch 32 is engaged, power flows from the movable disk of the clutch 32 to the first input of the forward-reverse clutch 38 via gears 34 and 36 (arrow 206).

The power then flows out of the clutch 38 (arrow 208) to reach the load 55 (arrows 210 and 212).

Figure 5:
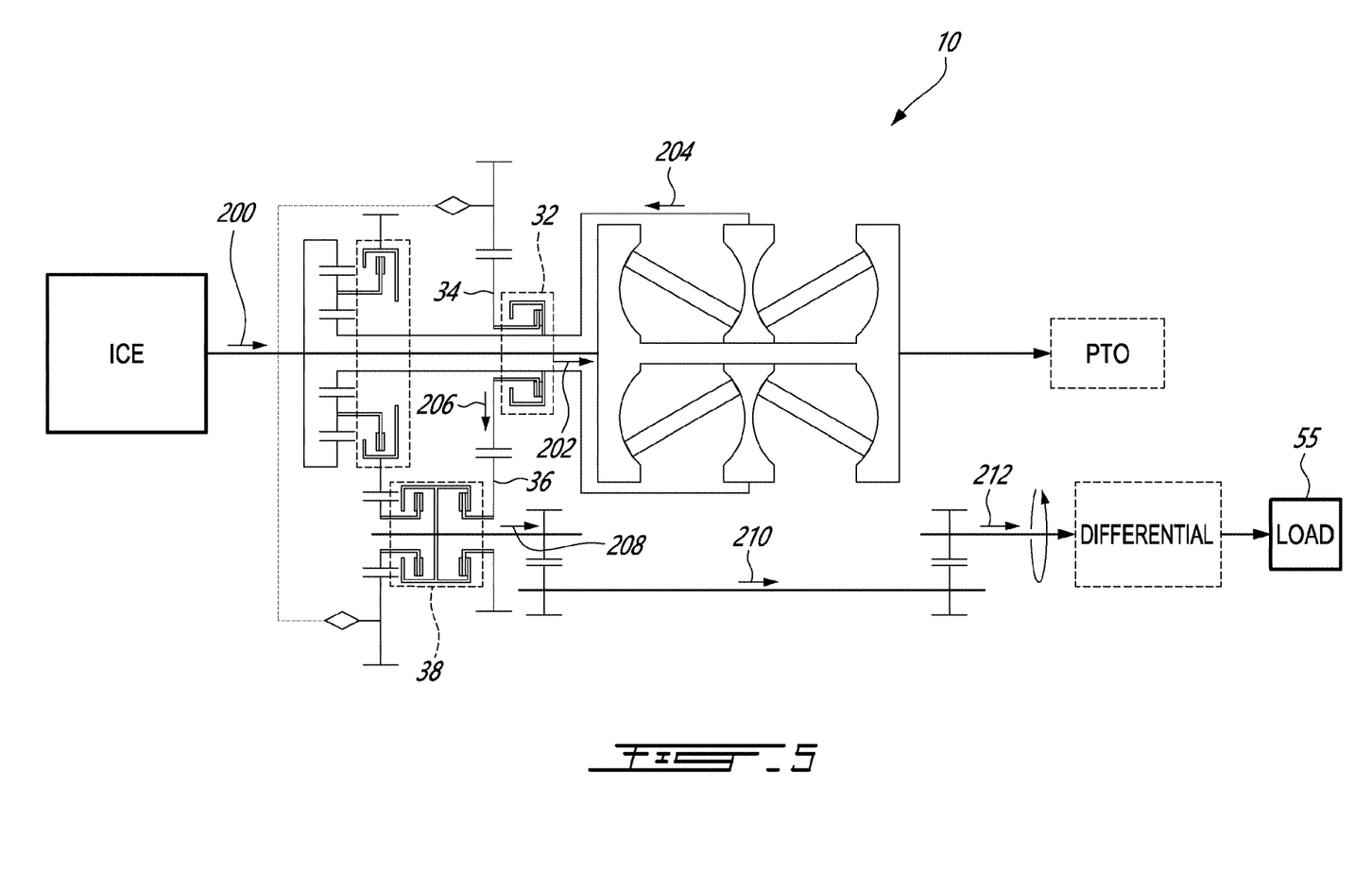
FIG. 5 is a schematic bloc diagram of the drivetrain of FIG. 1 shown at the maximal speed of the CVT forward mode.

When the CVT is moved from its underdrive position shown in FIG. 4 to its overdrive position of FIG. 5 (see arrows 214 in FIG. 4), the output speed of the drivetrain is increased towards its maximal speed. Indeed, since the power does not flow through the IVT gear assembly 26 in the CVT configuration, an increase in the output speed of the CVT causes an increase of the output speed of the drivetrain.

FIG. 5 shows the drivetrain 10 when the maximal speed of the CVT configuration is reached, i.e., when the CVT is in its fully overdrive position.

Turning now to FIGS. 6 to 9 of the appended drawings, the reverse direction operation of the drivetrain 10 will be described.

Figure 6:
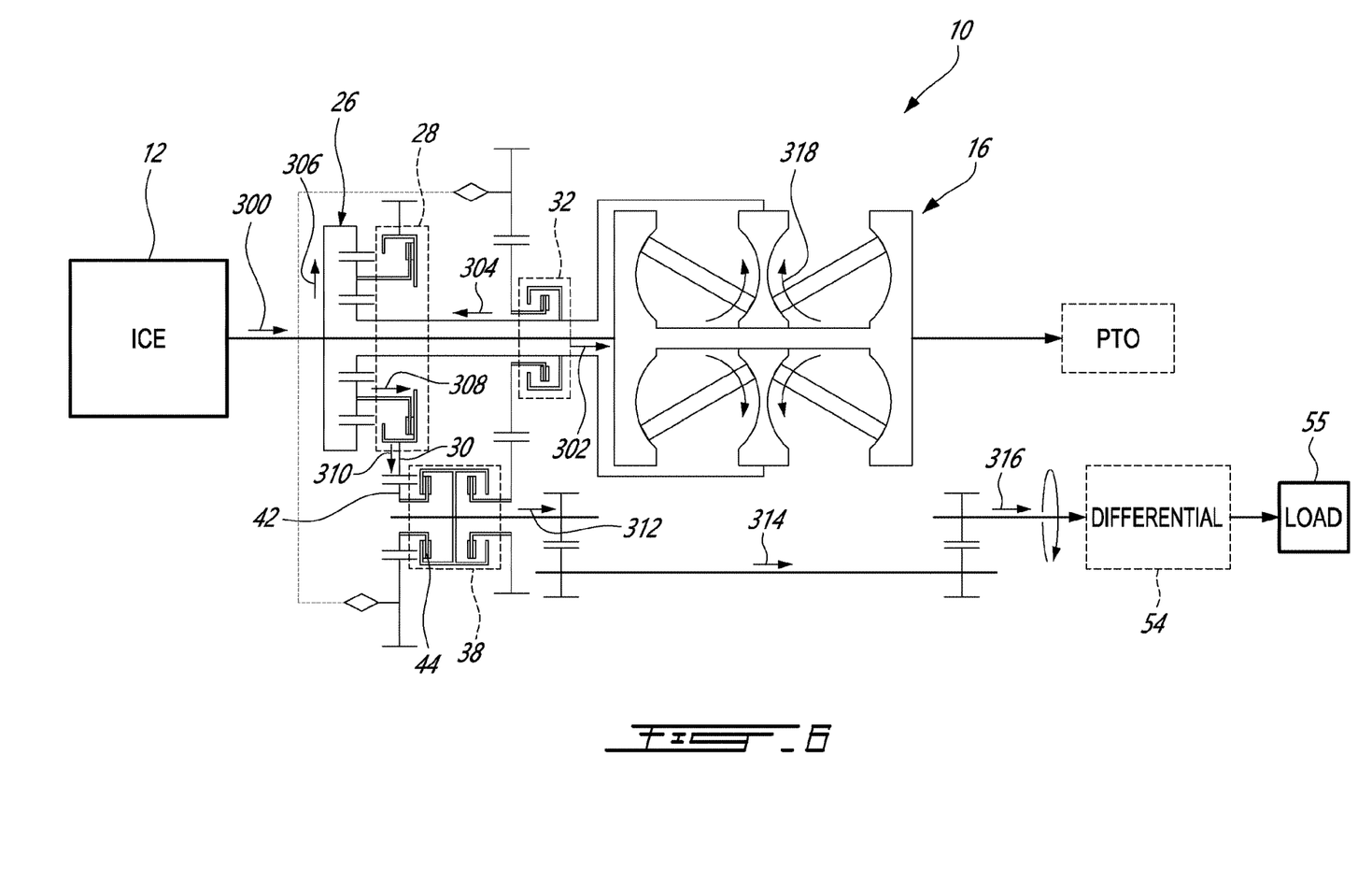
FIG. 6 is a schematic bloc diagram of the drivetrain of FIG. 1 shown in an IVT reverse mode.

For the beginning of the reverse direction operation of the drivetrain 10, as can be seen from FIG. 6, the CVT 16 is in its full overdrive position, the IVT clutch 28 is engaged, the CVT clutch 32 is disengaged and the second movable disk 44 of the three-position forward-reverse clutch 38 is engaged.

The arrows in FIG. 6 show the power path from the ICE 12 to the load 55 during the reverse direction operation of the drivetrain in IVT configuration.

More specifically, power flows from the ICE 12 to the CVT 16 (arrows 300 and 302), and from the CVT 16 to the second input of the IVT gear assembly 26, the sun thereof (arrow 304). Again, since the clutch 32 is disengaged, its fixed disk is rotating but no power flows therethrough.

Power also flows form the ICE 12 to the ring of the IVT gear assembly 26 (arrow 306).

The power combined by the IVT gear assembly 26 flows in (arrow 308) and out (arrow 310) of the IVT clutch 28 since this clutch is engaged.

The power therefore enters the second input of the forward-reverse clutch 38 via the meshed gears 30 and 42. Finally, the power flows out (arrow 312) of the clutch 38 to reach the load 55 (arrows 314 and 316)

As mentioned above, the configuration of the drivetrain 10 is such that the speed of the drivetrain 10 in its IVT configuration is lowest when the output speed of the CVT is highest, i.e., when the CVT is in its fully overdrive position as shown in FIG. 6. Accordingly, by changing the ratio of the CVT 16 towards the underdrive (as shown by arrows 318 in FIG. 6), the output speed of the drivetrain 10 increases.

Figure 7:
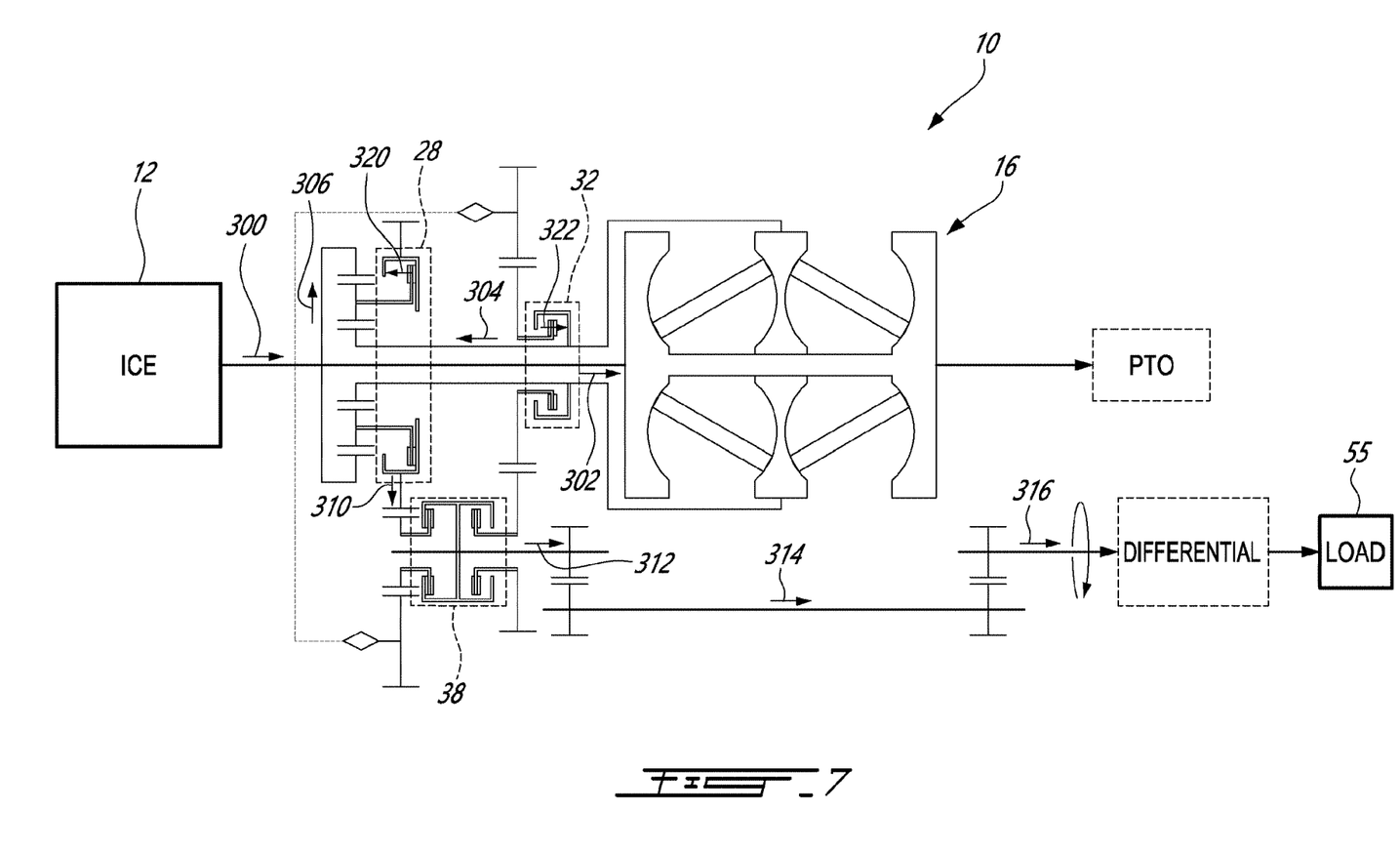
FIG. 7 is a schematic bloc diagram of the drivetrain of FIG. 1 shown at the maximal speed of the IVT reverse mode.

FIG. 7 shows the drivetrain 10 when the maximum reverse speed of the IVT configuration has been reached. When this is the case, the CVT is in full underdrive position, i.e., that the output speed of the CVT is at its lowest.

To further increase the reverse output speed of the drivetrain 10, a transition is done from the IVT configuration to the CVT configuration. To achieve this transition, the IVT clutch 28 is disengaged (see arrow 320) while the CVT clutch 32 is engaged (see arrow 322).

Again, one skilled in the art will understand that since the CVT is already in its fully underdrive position, it does not have to be brusquely moved to this position to yield the lowest speed of the CVT configuration. Furthermore, it is believed to be within the reach of one skilled in the art to calculate the gear ratios of the various gears of the drivetrain 10 so that the highest speed of the IVT configuration is equal or similar to the lowest speed of the CVT configuration. This way, as mentioned hereinabove, the transition from IVT to CVT, and vice versa, can be made simultaneously and without shocks.

Figure 8:
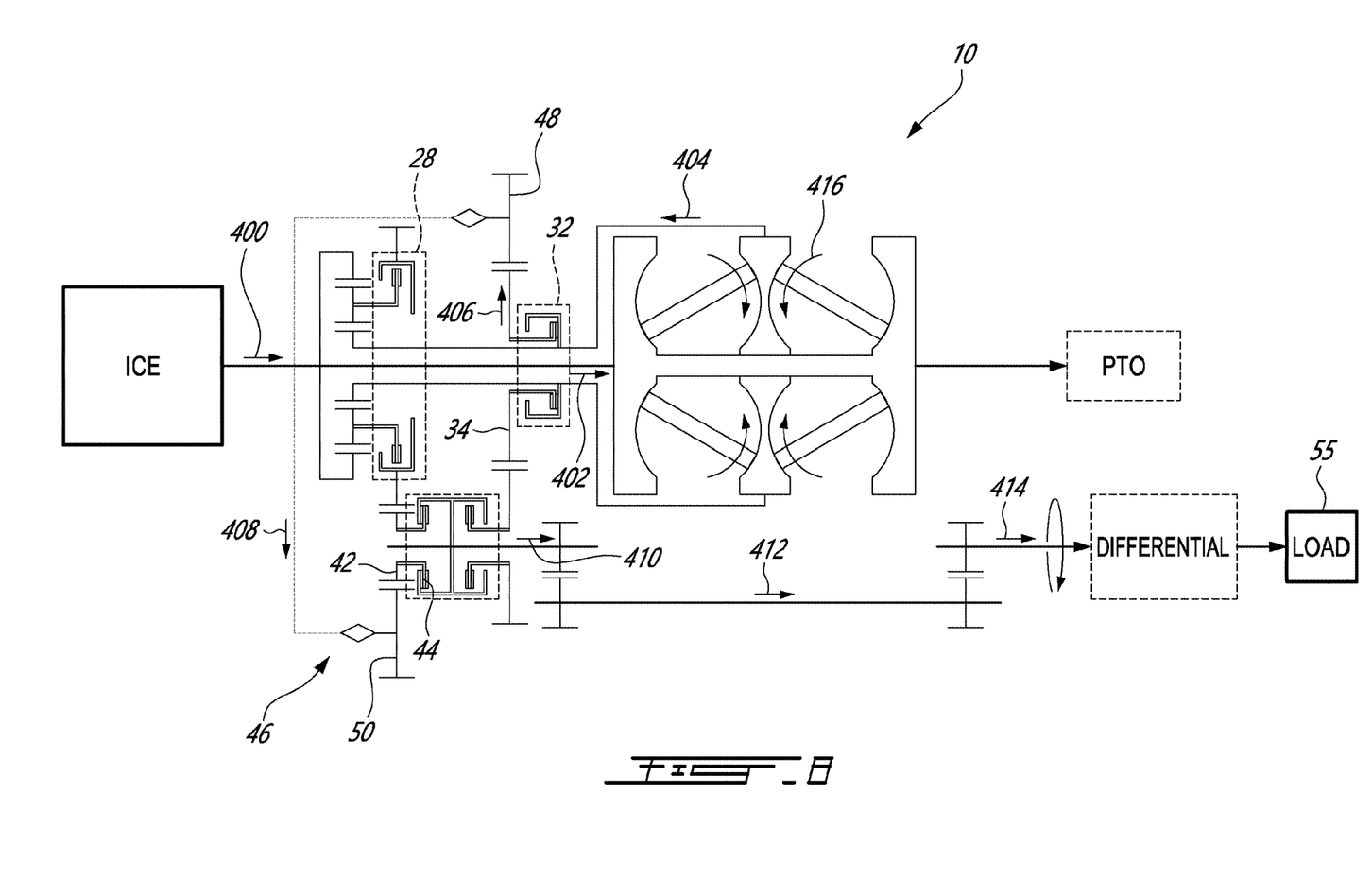
FIG. 8 is a schematic bloc diagram of the drivetrain of FIG. 1 shown during the synchronous IVT to CVT transition.

FIG. 8 shows the drivetrain 10 in its reverse direction CVT configuration where the IVT clutch 28 is disengaged and the CVT clutch 32 is engaged. Since we are still in the reverse mode, the second movable disk 44 of the forward-reverse clutch 38 is engaged.

The arrows in FIG. 8 show the power path from the ICE 12 to the load 55 when the drivetrain 10 is in the reverse direction CVT configuration.

More specifically, power flows from the ICE 12 to the CVT 16 (arrows 400 and 402), and from the CVT 16 to the fixed disk of the CVT clutch 32 (arrow 404). Since the clutch 32 is engaged, power flows from the movable disk of the clutch 32 to the second input of the forward-reverse clutch 38 via the idler gear assembly 46 meshed between gears 34 and 42 (arrows 406 and 408).

The power then flows out of the clutch 38 (arrow 410) to reach the load 55 (arrows 412 and 414).

Figure 9:
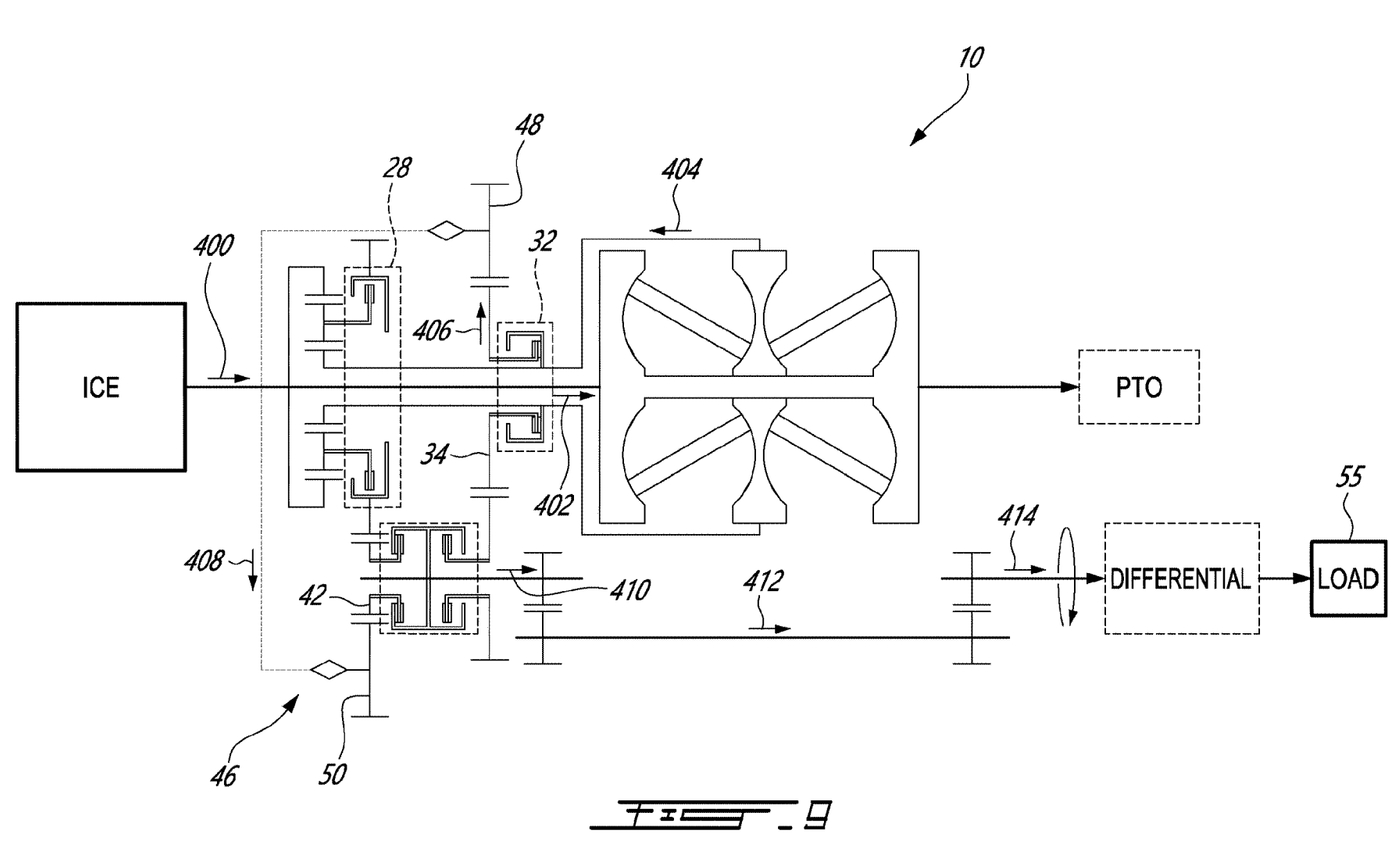
FIG. 9 is a schematic bloc diagram of the drivetrain of FIG. 1 shown at the maximal speed of the CVT forward mode.

When the CVT ratio is moved from the underdrive position shown in FIG. 8 to the overdrive position of FIG. 9 (see arrows 416 in FIG. 8), the reverse output speed of the drivetrain 10 is increased towards its maximal reverse speed.

FIG. 9 shows the drivetrain 10 in its CVT mode maximal reverse speed.

Figure 10:
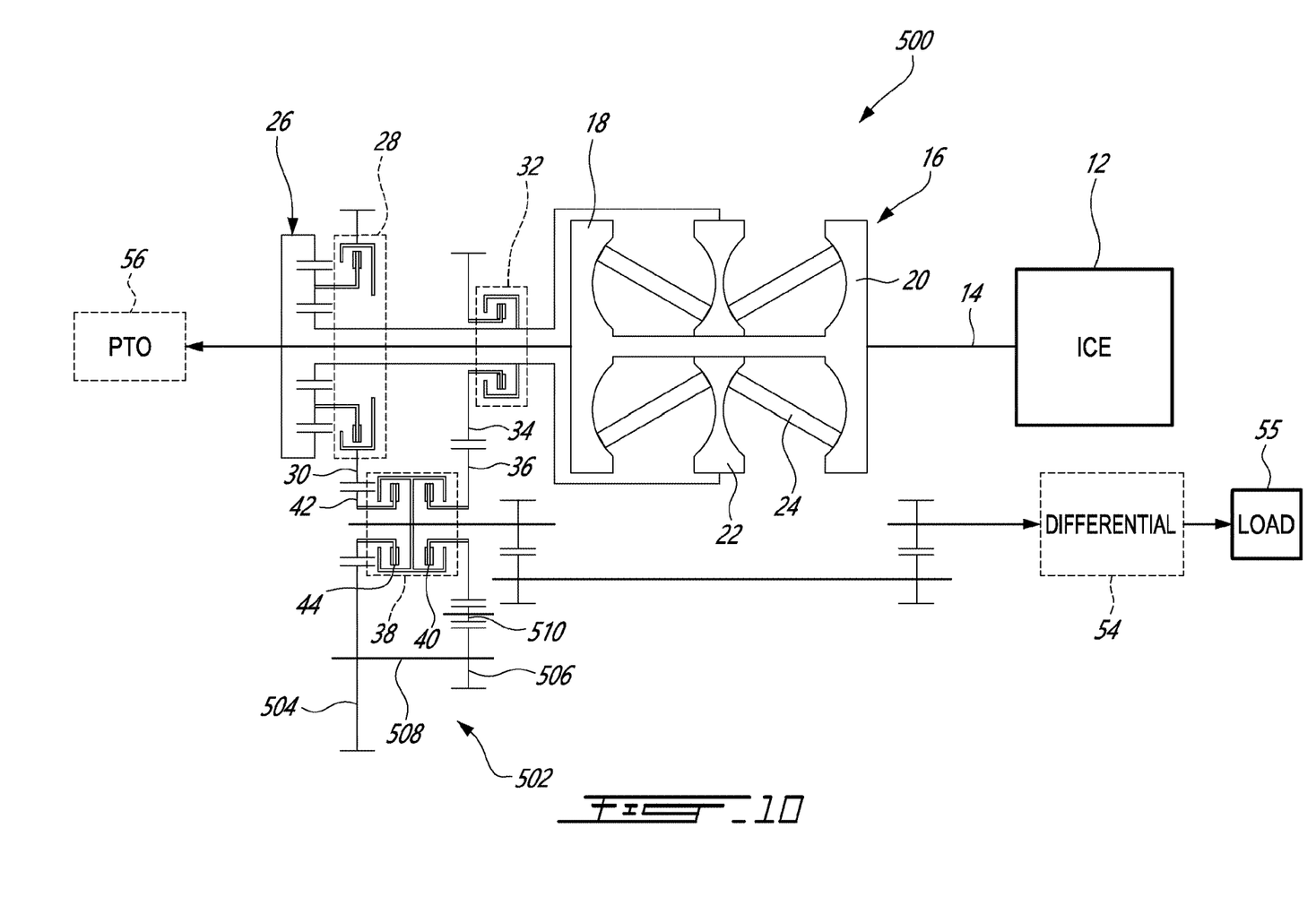
FIG. 10 is a schematic bloc diagram of a drivetrain configured for synchronous IVT to CVT transition according to a second illustrative embodiment the drivetrain being shown in a neutral mode.

Turning finally to FIG. 10 of the appended drawings, a drivetrain 500 according to a second illustrative embodiment will be described. Since the drivetrain 500 and the drivetrain 10 illustrated in FIGS. 1 to 9 and described hereinabove are very similar, only the differences therebetween will be described hereinbelow, for concision purpose.

Generally stated, a difference between the drivetrains 500 and 10 is the positioning of the various elements. Indeed, while drivetrain 10 of FIGS. 1 to 9 has the clutches and gear trains generally positioned between the ICE 12 and the CVT 16, the drivetrain 500 positions the CVT 16 next to the ICE 12. The operation of the drivetrain 500 is identical to the operation of the drivetrain 10 discussed hereinabove.

Another difference is the configuration of the idler gear assembly 502. Indeed, the idler gear assembly 502 directly interconnects the first and second inputs of the forward-reverse clutch assembly 38 instead of using the gear 34 as a direction reversing gear.

Accordingly, the idler gear assembly 502 includes a gear 504 meshed with the second input gear 42 and a gear 506 connected to the gear 504 via a shaft 508. The gear 506 is meshed with a direction reversal gear 510, itself meshed with the first input gear 36. According the first and second inputs of the forward-reverse clutch assembly always rotate in opposite directions.

One skilled in the art will understand that the idler gear assembly 502 operated in the same manner as the idler gear assembly 46 of FIGS. 1 to 9.

One skilled in the art will also understand that the purpose of the IVT gear assembly 26 is to generate an output that is a combination of its two inputs. Accordingly, other mechanical arrangements could be used. It is to be noted that it is believed within the reach of one skilled in the art to determine the various gear ratios of the IVT gear assembly 26 depending, amongst others, on the mechanical requirements of the drivetrain.

One skilled in the art will understand that the use of the idler gear assembly 46 allows for a much simpler mechanical configuration of the drivetrain 10 allowing the output of both the IVT and the CVT clutches to be supplied to both the first and second inputs of the forward-reverse clutch.

It is to be understood that the drivetrain configured for synchronous IVT to CVT transition is not limited in its application to the details of construction and parts illustrated in the accompanying drawings and described hereinabove. The drivetrain configured for synchronous IVT to CVT transition is capable of other embodiments and of being practiced in various ways. It is also to be understood that the phraseology or terminology used herein is for the purpose of description and not limitation. Hence, although the drivetrain configured for synchronous IVT to CVT transition has been described hereinabove by way of illustrative embodiments thereof, it can be modified, without departing from the spirit, scope and nature thereof.

What is claimed is:

1. A drivetrain for connection between an output of a prime mover and a load, comprising:
    a CVT including an input connected to the output of the prime mover and an output;
    a forward-reverse clutch assembly including first and second inputs and an output connectable to the load, the first input of the forward-reverse clutch assembly being connected to the output of the CVT through a CVT clutch;
    an IVT gear assembly having a first input connected to the output of the prime mover, a second input connected to the output of the CVT and an output connected to the second input of the forward-reverse clutch assembly through an IVT clutch; and
    an idler gear assembly interconnecting the first and second inputs of the forward-reverse clutch assembly,
    wherein the IVT gear assembly includes a planetary gear assembly, and
    wherein the first input of the IVT gear assembly is defined by a ring gear of the planetary gear assembly and wherein the second input of the IVT gear assembly is defined by a sun gear of the planetary gear assembly, the output of the IVT gear assembly being defined by a carrier of the planetary gear assembly.

2. The drivetrain as recited in claim 1, wherein the idler gear assembly includes a first gear associated with the first input of the forward-reverse clutch assembly via the CVT clutch, a second gear associated with the second input of the forward-reverse clutch assembly and a shaft interconnecting the first and second gears of the idler gear assembly.

3. The drivetrain as recited in claim 1, wherein the idler gear assembly includes a first gear associated to the first input of the forward-reverse clutch assembly via a direction reversal gear, a second gear associated with the second input of the forward-reverse clutch assembly and a shaft interconnecting the first and second gears of the idler gear assembly.

4. The drivetrain as recited in claim 1, further comprising:
    a differential provided between the output of the forward-reverse clutch assembly and the load, and a Power-Take-Off associated with the output of the prime mover.

5. A drivetrain, comprising:
    a prime mover including an output;
    a CVT including an input connected to the output of the prime mover and an output;
    a forward-reverse clutch assembly including first and second inputs and an output connectable to a load; the first input of the forward-reverse clutch assembly being connected to the output of the CVT through a CVT clutch;
    an IVT gear assembly having a first input connected to the output of the prime mover, a second input connected to the output of the CVT and an output connected to the second input of the forward-reverse clutch assembly through an IVT clutch; and
    an idler gear assembly interconnecting the first and second inputs of the forward-reverse clutch assembly,
    wherein the IVT gear assembly includes a planetary gear assembly and wherein the first input of the IVT gear assembly is defined by a ring gear of the planetary gear assembly and wherein the second input of the IVT gear assembly is defined by a sun gear of the planetary gear assembly, the output of the IVT gear assembly being defined by a carrier of the planetary gear assembly.

6. The drivetrain as recited in claim 5, wherein the idler gear assembly includes a first gear associated with the first input of the forward-reverse clutch assembly via the CVT clutch, a second gear associated with the second input of the forward-reverse clutch assembly and a shaft interconnecting the first and second gears of the idler gear assembly.

7. The drivetrain as recited in claim 5, wherein the idler gear assembly includes a first gear associated to the first input of the forward-reverse clutch assembly via a direction reversal gear, a second gear associated with the second input of the forward-reverse clutch assembly and a shaft interconnecting the first and second gears of the idler gear assembly.

8. The drivetrain as recited in claim 5, further comprising:
a differential provided between the output of the forward-reverse clutch assembly and the load, and a Power-Take-Off associated with the output of the prime mover.

9. A drivetrain for connection between an output of a prime mover and a load, comprising:
a CVT including an input connected to the output of the prime mover and an output;
a forward-reverse clutch assembly including first and second inputs and an output connectable to the load, the first input of the forward-reverse clutch assembly being connected to the output of the CVT through a CVT clutch;
an IVT gear assembly including a planetary gear assembly provided with a ring gear, a sun gear and planet gears interconnected by a carrier, the ring gear defining a first input connected to the output of the prime mover, the sun gear defining a second input connected to the output of the CVT and the carrier defining an output connected to the second input of the forward-reverse clutch assembly through an IVT clutch; and
an idler gear assembly interconnecting the first and second inputs of the forward-reverse clutch assembly.

10. The drivetrain as recited in claim 9, wherein the idler gear assembly includes a first gear associated with the first input of the forward-reverse clutch assembly via the CVT clutch, a second gear associated with the second input of the forward-reverse clutch assembly and a shaft interconnecting the first and second gears of the idler gear assembly.

11. The drivetrain as recited in claim 9, wherein the idler gear assembly includes a first gear associated to the first input of the forward-reverse clutch assembly via a direction reversal gear, a second gear associated with the second input of the forward-reverse clutch assembly and a shaft interconnecting the first and second gears of the idler gear assembly.

12. The drivetrain as recited in claim 9, further comprising:
a differential provided between the output of the forward-reverse clutch assembly and the load, and a Power-Take-Off associated with the output of the prime mover.

13. A drivetrain, comprising:
a prime mover including an output;
a CVT including an input connected to the output of the prime mover and an output;
a forward-reverse clutch assembly including first and second inputs and an output connectable to a load, the first input of the forward-reverse clutch assembly being connected to the output of the CVT through a CVT clutch;
an IVT gear assembly including a planetary gear assembly provided with a ring gear, a sun gear and planet gears interconnected by a carrier, the ring gear defining a first input connected to the output of the prime mover, the sun gear defining a second input connected to the output of the CVT and the carrier defining an output connected to the second input of the forward-reverse clutch assembly through an IVT clutch; and
an idler gear assembly interconnecting the first and second inputs of the forward-reverse clutch assembly.

14. The drivetrain as recited in claim 13, wherein the idler gear assembly includes a first gear associated with the first input of the forward-reverse clutch assembly via the CVT clutch, a second gear associated with the second input of the forward-reverse clutch assembly and a shaft interconnecting the first and second gears of the idler gear assembly.

15. The drivetrain as recited in claim 13, wherein the idler gear assembly includes a first gear associated to the first input of the forward-reverse clutch assembly via a direction reversal gear, a second gear associated with the second input of the forward-reverse clutch assembly and a shaft interconnecting the first and second gears of the idler gear assembly.

16. The drivetrain as recited in claim 13, further comprising:
a differential provided between the output of the forward-reverse clutch assembly and the load, and a Power-Take-Off associated with the output of the prime mover.

* * * * *